United States Patent [19]

Bartle

[11] Patent Number: 5,479,023
[45] Date of Patent: Dec. 26, 1995

[54] METHOD AND APPARATUS FOR DETECTING CONCEALED SUBSTANCES

[75] Inventor: Colin M. Bartle, Wilton, New Zealand

[73] Assignee: Institute of Geological and Nuclear Sciences, Ltd., New Zealand

[21] Appl. No.: 318,691

[22] PCT Filed: Apr. 14, 1993

[86] PCT No.: PCT/NZ93/00025

§ 371 Date: Oct. 11, 1994

§ 102(e) Date: Oct. 11, 1994

[87] PCT Pub. No.: WO93/21546

PCT Pub. Date: Oct. 28, 1993

[30] Foreign Application Priority Data

Apr. 9, 1992 [NZ] New Zealand ............... 237767

[51] Int. Cl.⁶ .................. G01N 23/06; G01N 23/09; G01N 23/10
[52] U.S. Cl. .................. 250/390.04; 250/359.1; 378/53; 378/57
[58] Field of Search ............ 250/390.02, 390.04, 250/391, 392, 393, 394, 395, 358.1, 359.1; 378/53, 57

[56] References Cited

U.S. PATENT DOCUMENTS

| | | | |
|---|---|---|---|
| 3,508,047 | 4/1970 | Mott et al. | 250/390.04 X |
| 4,884,228 | 11/1989 | Stanley et al. | |
| 4,884,288 | 11/1989 | Sowerby | 378/53 X |
| 4,941,162 | 7/1990 | Vartsky et al. | 378/53 X |
| 5,068,883 | 11/1991 | DeHaan et al. | |
| 5,278,418 | 1/1994 | Broadhurst | 250/390.04 |

FOREIGN PATENT DOCUMENTS

| | | | |
|---|---|---|---|
| 59-77346 | 5/1984 | Japan | 378/53 |
| 61-71341 | 4/1986 | Japan | 378/53 |
| 213777/ | | | |
| 214666 | 10/1985 | New Zealand | |
| 528012 | 6/1989 | U.S.S.R. | 250/390.04 |
| 1389838 | 4/1975 | United Kingdom | 250/390.04 |
| 9111009 | 7/1991 | WIPO | |
| 9114938 | 10/1991 | WIPO | |

OTHER PUBLICATIONS

Grodzins, L., Applications of Nuclear Techniques, International Conference Proceedings, Heraklio, Crete, Greece, Jun., 1990.

Bartle, C. M., Simultaneous Transmission of Neutrons and Gamma Rays (NEUGAT) to Measure Fat in Meat, Appl. Radiat. Isot. vol. 42, No. 11, pp. 115–556, 1991, Pergamon Press, Great Britain.

Bartle, C. M., Determination of the Moisture Content of Wheat Using the NEUGAT Technique, Nuclear Instruments and Methods in Physics Research A291 (1990) 655–661, North Holland.

Bartle, C. M. et al., Neutron–Gamma Transmission (NEUGAT) Based Composition Measurements Using an Acclerator, Nuclear Instruments and Methods in Physics Research A254 (1987) 219–221, North Holland, Amsterdam.

*Primary Examiner*—Carolyn E. Fields
*Assistant Examiner*—Edward J. Glick
*Attorney, Agent, or Firm*—Woodard, Emhardt, Naughton, Moriarty & McNett

[57] ABSTRACT

A method and apparatus detects the presence of a number of substances such as explosives or drugs in a container such as luggage (10) at an airport. The containers, travelling on a conveyor (15) for example are irradiated with fast neutron and gamma source radiation (6) preferably simultaneously and preferably of different frequencies. The radiation is detected (7) and the extent to which each species of the source of radiation is transmitted through the container is measured. The measurements are analyzed with reference to the known characteristic attenuation coefficients and density properties of those substances for each species of the source radiation.

23 Claims, 6 Drawing Sheets

Monitor

Sample

METHOD AND APPARATUS FOR DETECTING CONCEALED SUBSTANCES

TECHNICAL FIELD

This invention relates to a method and device for detecting concealed substances such as explosives or drugs, for example in luggage at an airport.

Explosives are occasionally concealed in luggage and parcels by terrorists for example, and smuggled through airports despite the efforts of customs officers. These devices are often not found because the daily volume of luggage and cargo is such that manually searching every item is simply impractical.

The Lockerbie disaster in 1988 highlighted the danger posed by Semtex, a plastic explosive that is difficult to detect by conventional means, particularly when formed into thin sheets. It is believed that the bomb contained only ½ kg of Semtex which was packed into a portable radio.

The U.S. Federal Aviation Administration (FAA) is searching for a means of detecting concealed explosives and has set minimum requirements for such a detection system.

A balance must be struck between the risk of not detecting an explosive and the delay and disruption caused by searching and false alarms since while the detonation of an explosive device in an airport or aircraft is a rare event, delays and disruptions are daily concerns.

BACKGROUND ART

Most explosives are characterized by high nitrogen and oxygen content and low carbon and hydrogen content. They are also usually of high density. Aware of this, the FAA began funding tests of thermal neutron activation (TNA) in 1985. TNA involves the use of a radioactive source such as Californium-252 which emits neutrons. The neutrons are slowed or moderated in materials high in hydrogen such as polyethylene (at which stage the neutrons are "thermalized") and are then absorbed by the object of interest. The absorption leads to the emission of gamma rays which are characteristic of the elements present.

Analysis of these rays provides information as to the nitrogen content of the object bombarded. While explosives characteristically have a high nitrogen content, so do other materials such as certain plastics, silk and nylon which are commonly contained in luggage. Unfortunately TNA screening devices cannot distinguish between explosive materials and these non-explosive materials and so false alarms are often raised which can cause considerable delays. Also, TNA scanning devices require a very intense neutron source and extreme measures are needed to shield airport staff and travellers from the radiation.

The sensitivity of these devices is also less than desirable but improving that would increase the incidence of false alarms. Furthermore, TNA scanning devices are about the size of a small car, can weigh of the order of 10 tonnes and cost about $1 million each. Also, it has been suggested that between 300 and 700 such units would be required to deal with the demands of large international airports in the United States at a cost of $500 million for the machines plus housing and operating costs of at least $92 million a year.

Dual beam X-ray machines are being field tested. They can detect organic materials, such as explosives, with one beam and inorganic materials, such as metals, with the other beam.

Hand-held vapour sniffers are also being tested. These take in air and identify molecules in terms of their vapour pressure, atomic weight and liquid solubility by chromographic means.

Plastic explosives such as Semtex however have a lower vapour pressure than TNT so they can be difficult to detect by such means.

Computerised tomography or CT scanning commonly used in medical diagnosis and research has been applied to the problem by scanning for an object's density, total mass and indicating its atomic number and composition. But as Dr. Grodzin of MIT explained at an international meeting (International Conference on Accelerators in Industry and Research, Denton, Tex., Nov. 5–9, 1990): "More than a dozen nuclear-based techniques have been proposed for rapidly scanning airport luggage to find hidden explosives by measuring their elemental distributions. In most almost every scheme, the technological challenge is the accelerator, which must produce its intense beams of neutrons and photons . . . in an airport environment, perhaps even in an airport concourse".

DISCLOSURE OF THE INVENTION

The object of the invention is to provide an improved or at least alternative method and apparatus for detecting concealed substances including particularly explosives.

In broad terms the invention comprises a method for detecting the presence of a number of substances in a container, comprising irradiating the container with fast neutron and gamma source radiation, measuring the extent to which each species of the source radiation is transmitted through the container, and analysing the measurements with reference to the known characteristic attenuation coefficients and density properties of the substances for each species of the source radiation.

The invention also comprises apparatus for detecting the presence of a number of substances in a container, which comprises means for irradiating the container with fast neutron and gamma source radiation, means for measuring the extent to which each species of said radiation is transmitted through the container, and means for analysing the measurements with reference to the known characteristic attenuation coefficients and density properties of the substances for each species of the source radiation.

In this specification and claims "container" includes suitcases, bags, packages, boxes, parcels, freight containers and containers of any type for carrying luggage or goods or the like, and in particular "containers" that are moved through airports, rail and shipping terminals, postal distribution centres and the like.

Also, in this specification "substance" is intended to include any substance that is desired to be detected if present in a container, but the method and device of the present invention will be described in terms of detecting explosives or drugs only.

Preferably the neutron and gamma radiation are emitted substantially simultaneously and they have different flight times to the detectors, or different responses in the detectors so they can be readily distinguished.

Preferably the source radiation is obtained from a radioactive isotopic source such as $^{252}$Cf or Am—Be, perhaps by means of a particle accelerator/target system.

Preferably the device of the present invention has means for conveying a number of containers between the irradiating means and the transmission measuring means.

Preferably the transmission measurements are analysed by a data processor and the results are displayed on a monitor.

Preferably the transmission measurements are combined with data collected by TNA measuring equipment and/or x-ray measuring equipment.

Preferably the device has an alarm system that is triggered when one of the substances is detected.

When the substance for detection is an explosive substance qualitative analysis or detection can be made on the basis that explosive substances characteristically have a high nitrogen and oxygen content but a low carbon and hydrogen content. The thickness or the amount of explosive substance is not required to be known, thus Semtex sheets are no less easily detectable than Semtex sticks or lumps.

Preferably, neutron and gamma radiation are simultaneously transmitted through the container and the reduction of intensities of the two radiations together is analysed to yield information of material thickness and mass attenuation coefficients. We refer to this method as the "NEUGAT" (trademark) method (is neutron/gamma transmission). Preferably a computer is employed to display such information graphically for example by plotting characteristic explosive composition against density so that action can be taken if an explosive-like substance is detected.

Each scan can be analysed as a combination of hypothetical explosive and non-explosive material or, drugs and non-drugs material. This is possible since on average the density of the contents of a suitcase is about 0.2 g/cm³ whereas the densities of explosive substances and drugs are typically about 1.6 g/cm³ and about 1.0 g/cm³ respectively.

Complementary techniques can also be incorporated. For example, positron emission tomography and x-ray scanning can be used in addition to a nuclear technique with neutrons.

The neutron and gamma radiation can be provided from any suitable source, for example a radioactive isotope source such as $^{252}CF$ or Am—Be or a nuclear particle accelerator target system. All sources can be kept well within the limits required for operation in a public work-place. It also provides sufficient precision when detecting explosives since the neutron absorption coefficients vary by only approximately 20%.

New Zealand patent specification 213777/214666 discloses a method and an apparatus for quantitatively analysing a mixture of two or more components, such as meat and fat, using neutron/gamma transmission scanning technology. The disclosure of that specification is to be incorporated by reference into the specification of the present application.

According to New Zealand patent specification 213777/214666, to obtain quantitative analysis of an n-component system, at least n distinguishable species of radiation are required and a mathematical analysis is made by solving the n simultaneous equations describing the extent of transmission of each species of radiation to find the weight fraction of each component. This is described in more detail as follows:

Radiation is passed through the object being measured and the transmitted radiation intensities are measured simultaneously by a suitable detector or array of detectors that is/are connected to an electronic measuring and computing apparatus. In a layered system, a more complex analysis can be made by considering the known length of material through which the radiation passes and the densities of the layered components so that the depths of each layer can be measured.

Each component of the object mixture has a different known mass attenuation coefficient for each species of source radiation. The attenuated intensities (countrates) of neutron and gamma radiation must also be measured when there is no object in the beam to account for background radiation.

When there is an object in the beam the intensities of the neutron and gamma radiation received by the detector(s) can be described in terms of a two-component system for example as follows:

$$I_n = I_{no} \exp[-(u_{na}M_a + u_{nb}M_b)] \quad (A)$$

$$I\gamma = I\gamma_o \exp[-(u\gamma_a M_a + u\gamma_b M_b)] \quad (B)$$

wherein $I_n$ and I are the countrates of neutron and gamma rays after passing through the object; $I_{no}$ and $I\gamma_o$ are their unattenuated countrates; $\mu_{na}$, $\mu_{nb}$, $\mu\gamma_a$ and $\mu\gamma_b$ are the neutron and gamma ray mass attenuation coefficients of components a and b, for the source radiation employed; and $M_a$, $M_b$ are the mass thicknesses (mass per unit area in the beam) of the components a and b.

Solving these two simultaneous equations (A and B) will give the values of $M_a$ and $M_b$ and the weight fraction, for example, of component a, is then simply $M_a/(M_a+M_b)$.

It should be noted that it is not necessary to know the thickness of the object to make this simple calculation. And the measurement can be integrated over the object volume sensed by the detector or detector array to give the overall weight fraction for that volume.

DESCRIPTION OF THE DRAWINGS

A preferred form of apparatus of the invention is diagrammatically represented in the accompanying drawings by way of example only and they are not intended to limit the scope of protection sought which is defined by the claims. In the drawings:

Figure 1:
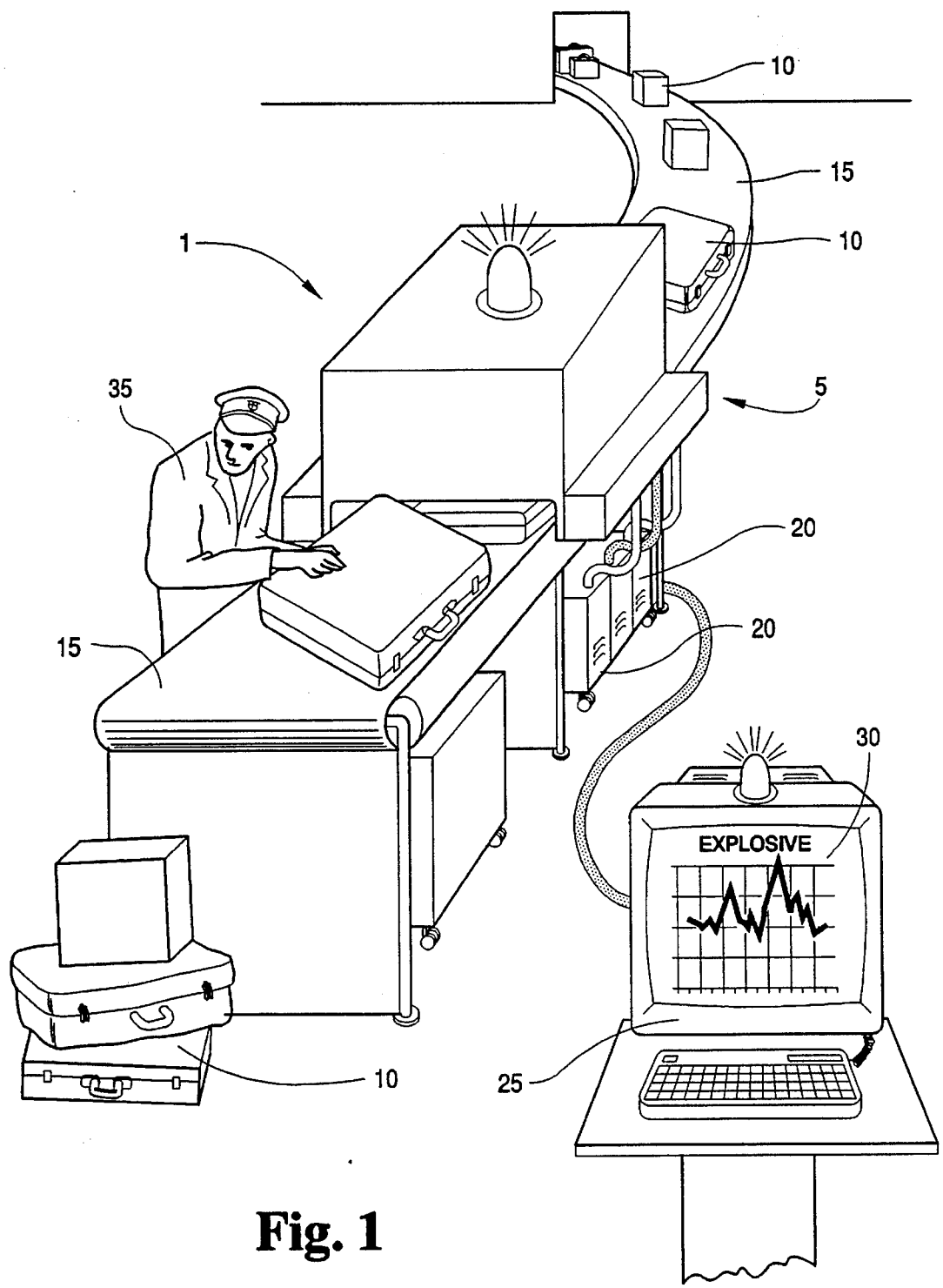
FIG. 1 shows the preferred form apparatus for detecting the presence of substances such as explosives or drugs in suitcases, travel bags and other containers of luggage that often pass through the customs section of an airport.
Figure 2:
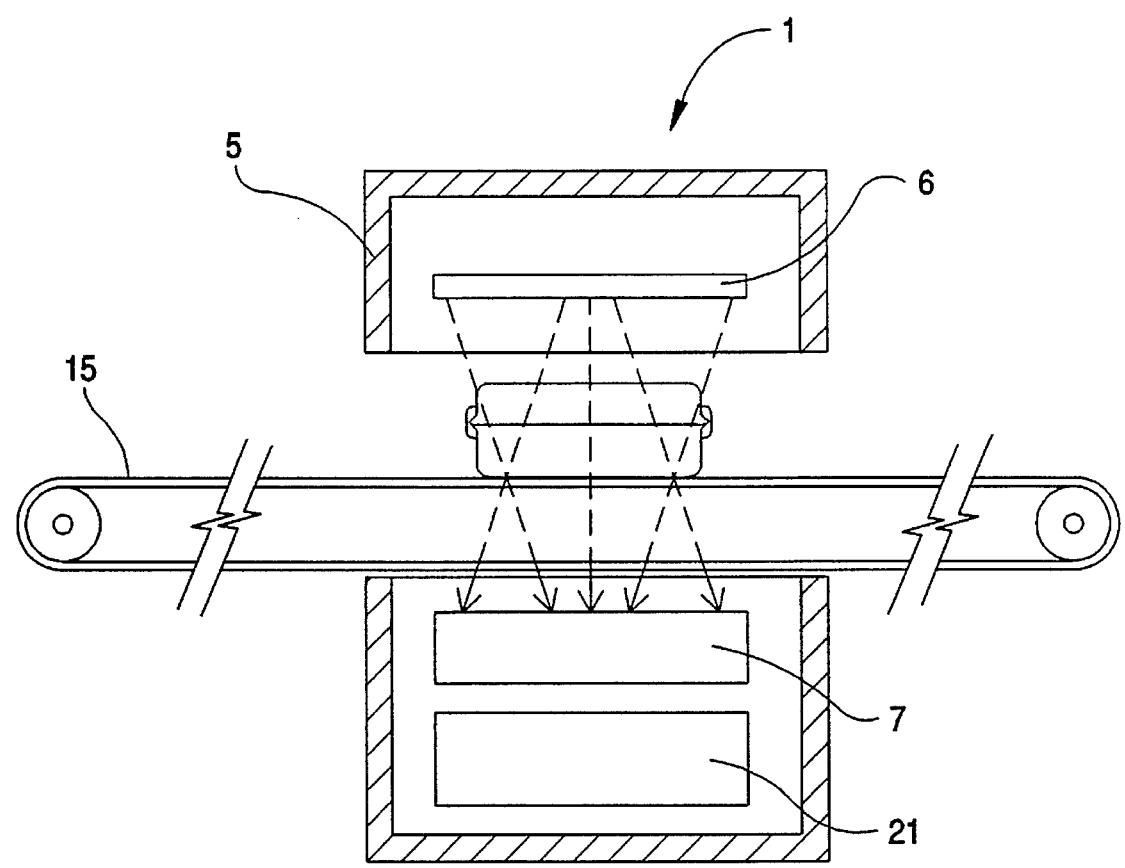
FIG. 2 is a cross-sectional view through the preferred form apparatus of FIG. 1.

The preferred form apparatus 1 shown in FIGS. 1 and 2 has a detection unit 5 through which suitcases, travel bags and other containers 10 can be passed by means of a conveyor 15 in an airport, rail or shipping terminal, or the like.

The detection unit 5 houses means for irradiating a container 10 within the detection unit 5 with simultaneous fast neutron and gamma radiation. Sources 6 of neutron and gamma radiation are surrounded by radiation shielding within the detection unit 5. A number of detectors 7 are below the conveyor 15 carrying containers such as luggage as shown. The detectors 7 are supported by detection equipment 20 which includes photo multipliers 21. The detectors and the detection equipment 20 enable each species of said radiation to be detected after transmission thereof through the container 10 that is being analysed. The detection equipment 20 is conveniently located below the detection unit 5 and the containers 10 pass through the detection unit 5 one by one between the irradiating means and the detectors.

Data processing facilities such as a computer 25 are connected to the detection unit 5 so that data collected by the detectors of the detection equipment 20 is processed by the computer 25 and displayed by a monitor 30 in a form an operator stationed at the detection unit 5 can readily interpret. If the operator having considered the information displayed by the monitor 30, suspects the suitcase or other container 10 contains an explosive substance the operator simply stops the conveyor 15 and takes whatever action is required.

The use of the apparatus 1 avoids the delay and disruption caused by manually searching all or selected containers. The apparatus 1 may be fully automated so that an operator is alerted when the computer 25, programmed with appropriate software, recognises an explosive-like substance in a suitcase or other container 10.

The detection unit 5 contains NaI(Tl) [sodium iodide] or B90 [bismuth germanate] scintillation detectors.

The detection equipment 20 may conveniently comprise, for example, a number of Nuclear Enterprises NE213 liquid scintillators or Bicron BC 501 liquid scintillators (an organic scintillator utilizing proton recoil and pulse shape discrimination), in a cell 15 cm in diameter and 15 cm in thickness, coupled to Philips XP2041 or RCA 8854 photomultiplier tubes. Standard electronic measuring equipment can be used. Such a system, used in conjunction with an Am—Be source of about 10 curie or a 25 µg Californium-252 source.

Figure 3:
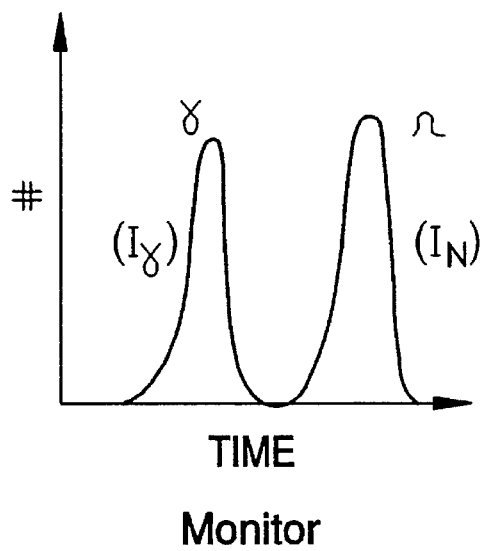
FIGS. 3 and 4 represent time of flight spectra in the monitor and detectors of the preferred form apparatus of the invention.
Figure 4:
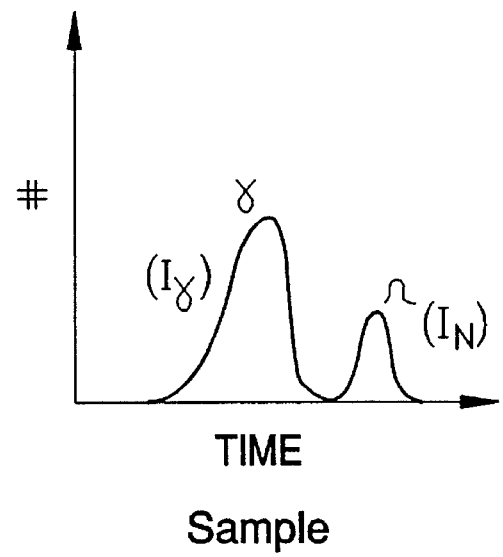

The time of flight spectra in the monitor 30 and detectors are represented in FIGS. 3 and 4 of the drawings.

The preferred form apparatus of the present invention operates by scanning the container with fast neutrons and gamma rays to measure the transmission properties, simultaneously measuring the characteristic $\gamma$-rays from neutron capture on nitrogen and combining information on container mass and volume. In this way, regions of the scan that are characteristic of explosive substances can be identified.

Lower neutron fluxes are used in comparison to present machines based wholly on the $^{14}N(n,\gamma)^{15}N$ reaction. This eases the problem of using intense radiation sources in an airport environment. The strength of the source used should be about 1% of those presently used.

An important feature of the device 1 is that it measures a key quantity, $W_R$ or W (described below) which is independent of the thickness of the material within the container that is scanned.

Am—Be or 252-Cf or a pulsed accelerator are suitable for use as sources of radiation but other radioactive materials known to one skilled in the art can be used. The pulsed accelerator involves an energetic deuteron beam (e.g. 2 MeV) incident for example on a deuterium gas target, a tritium gas target, a Beryllium or Lithium target producing reactions respectively $^2H(d,n)^3He$; $^3H(d,n)^4He$; $^9Be(d,n)^{10}B$; $^7Li(d,n)^8Be$, which are all neutron producing reactions.

Figure 5:
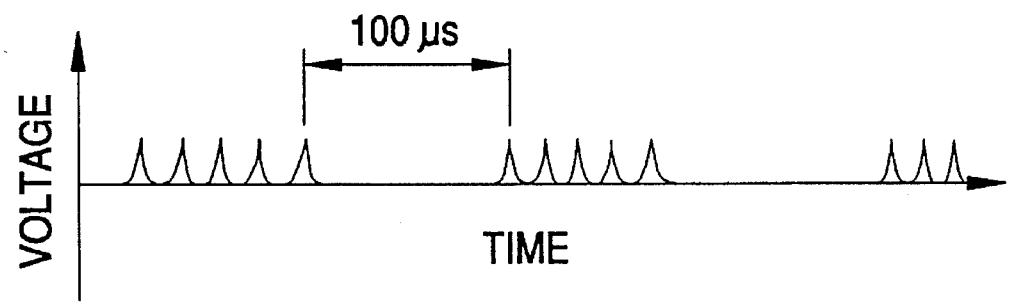
FIG. 5 is a graphical representation of the pulsing of radiation by means of a pulsed accelerator.

The pulsed beam allows the separation of neutrons and gamma ray events in time since neutrons take longer times to travel to the detectors than the $\gamma$-rays. The beam can pulse as illustrated in FIG. 5 wherein the separation of pulses is about 250 ns.

During the short burst periods fast neurons and $\gamma$-rays are detected. During the 100 µs period the $\gamma$-rays from neutron thermalisation and capture by $^{14}N$ are detected. Detection during the 100 µs period minimises interference from the direct deuteron beam which is off in this period.

Detection of Drugs and Explosives

Several variations are possible:

Equations:

Neutron transmission through container;

$$I_n/I_{no} = \exp\{\mu_{n1}m_1 + \mu_{n2}m_2\} \qquad (1)$$

Gamma transmission through container:

$$I\gamma/I\gamma_o = \exp\{\mu\gamma_1 m_1 + \mu\gamma_2 m_2\} \qquad (2)$$

Thickness of contents if pure explosive;

$$X = \ln\left(\frac{I_{\gamma o}}{I_\gamma}\right) / (\mu\gamma_{exp}\,\rho_{exp}) \qquad (3)$$

density of contents of container if pure explosive;

$$RHO = \frac{m1 + m2}{x} \qquad (4)$$

Figure 6A:
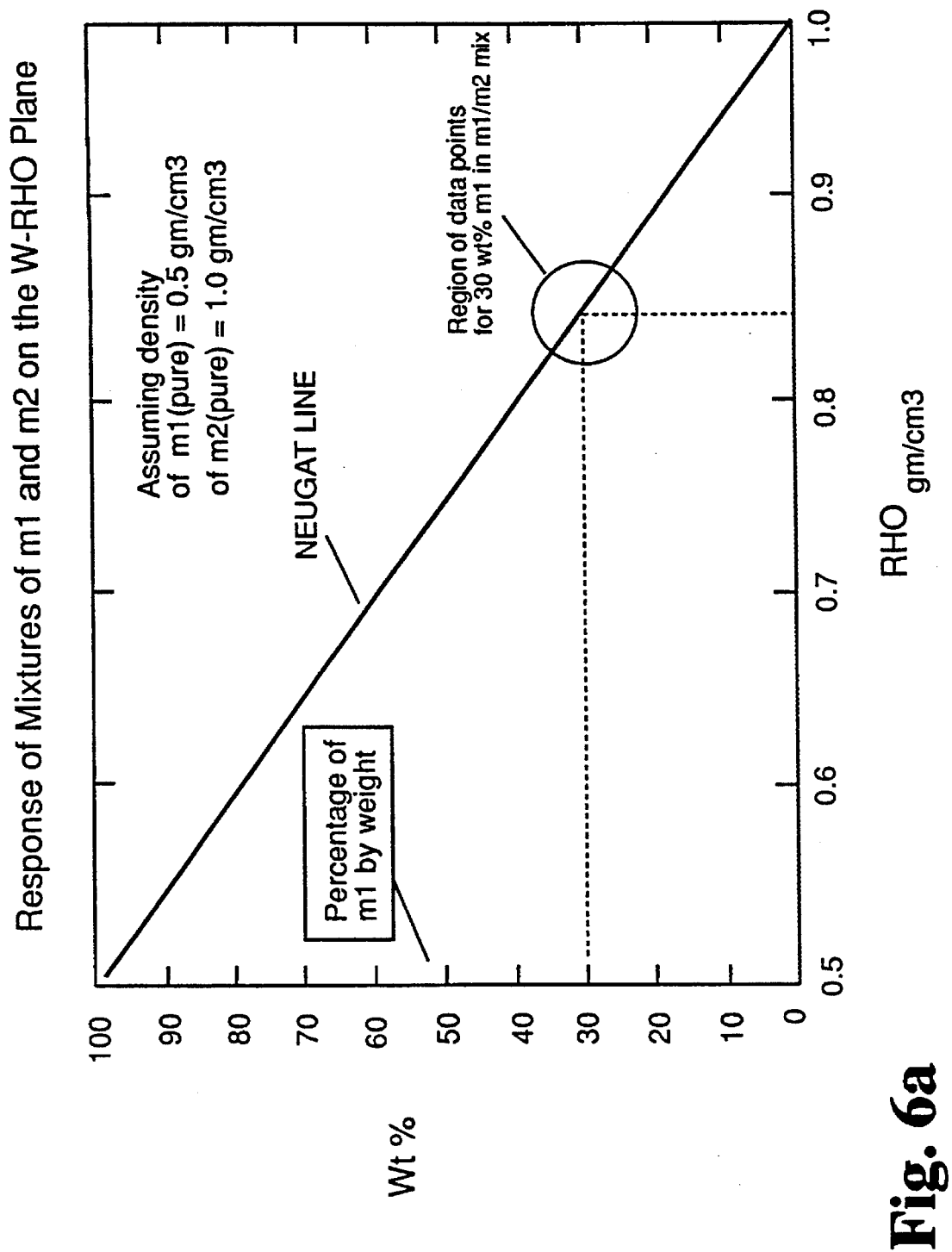
FIG. 6a represents the calculated composition expressed as a weight percent (wt %), W, against density, RHO, and shows an operational line called the "NEUGAT" line which in general will be a curve.
Figure 6B:
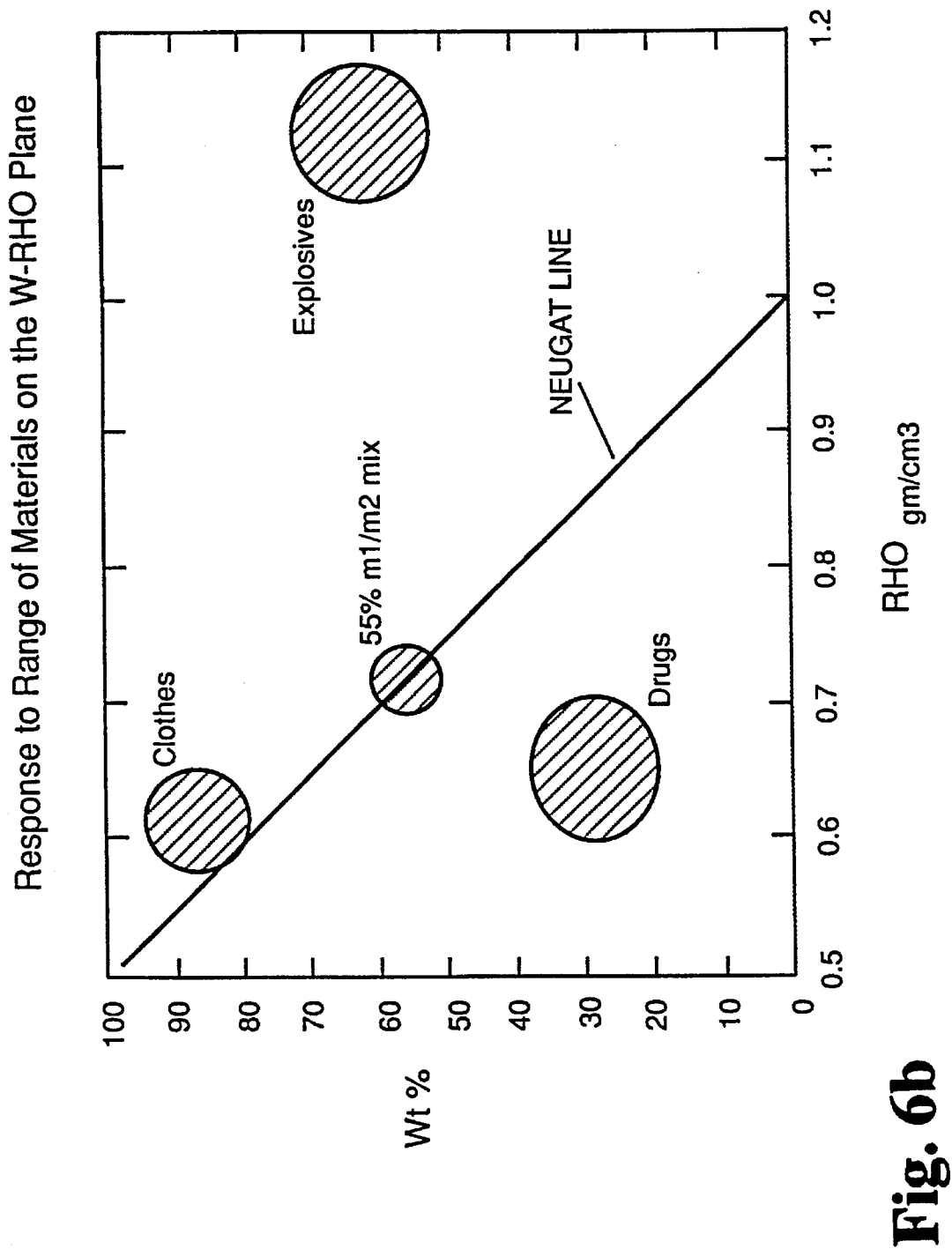
FIG. 6b is similar to FIG. 6a but shows a hypothetical separation of explosives, drugs and clothes signals on which basis a customs officer can decide whether a suitcase should be manually searched.

Contents "factor"

$$W = W_R = \frac{m_1}{m_1 + m_2} \qquad (5)$$

the data collected can be graphically represented as shown in FIGS. 6a and 6b.

Objects are scanned and moment by moment measurements made. Each measurement involves the following:

The results of the analysis of the transmissions of the neutrons and the gamma rays as counted in the detector are represented in a two (or more) dimensional region called a W-RHO plane which is defined by the software. This plane has certain mathematical characteristics which will now be described.

A mixture of two standard materials (which may be fictitious) are characterized by certain mass attenuation coefficients. The real time measurements of this mixture can be represented as follows:

The composition is calculated from equation 5 (usually expressed as a weight percent (wt %), W) by multiplying the result from equation 5 by 100. These wt % values define the Y values in the W-RHO plane. The X values are calculated from the quantity given by equation 4 wherein x is the effective thickness for the particular measurement. The effective thickness is determined from the attenuation of the gamma ray component alone. The expression:

$$\ln(I_{\gamma o}/I_\gamma) = \mu_{\gamma 1}M1 + \mu_{\gamma 2}M2 \qquad (6)$$

is used to estimate the amount of material in the beam. A value of the wt % is a "working value" that is adopted solely for the purposes of the thickness calculation. The masses per unit area of the two components are indicated here by M1 and M2 (large letters) to distinguish them from the NEUGAT estimates $m_1$ and $m_2$ deduced from equations 1 and 2.

$$\text{Now, wt \% } W = (M1/(M1+M2))*100 \qquad (7)$$

and equations 6 and 7 can be used to solve for M1 and M2. The effective thickness, x, can be calculated from:

$$x = (M1/rho1) + (M2/rho2) \qquad (8)$$

wherein rho1 is the density of pure material 1 and rho2 is the density of pure material 2. It is this value "x" which is substituted into equation 4 and defines the X axis of the W-RHO plane.

An operational line can be defined on the W-RHO plane but which is only relevant when mixtures of the "standard" materials 1 and 2 are being analyzed. This operational line is called the "NEUGAT line" and is analogous to the load line used to represent the range of values which can be taken up by electronic devices such as amplifiers. In general the line will be a curve defined by the equation:

$$W = 100 \frac{(rho1)(rho2)}{(rho2-rho1)} \frac{1}{RHO} \frac{rho1}{(rho2-rho1)} \qquad (9)$$

The end points for NEUGAT measurements are:

$$\text{when RHO=rho1 then } W=100 \qquad (10)$$

$$\text{when RHO=rho2 then } W=0 \qquad (11)$$

The NEUGAT line is shown in FIG. 6a. The region where data for a sample consisting of 30 wt % material 1 (m1) is also indicated in that Figure. If mixtures of the "standard" materials 1 and 2 are being analysed the data will fall in a group for a certain mixture somewhere along the NEUGAT line.

The thicknesses of material in the beam can vary considerably so real time corrections are preferably made to the mass attenuation coefficients for each measurement in a sequence based on the effective thickness for that measurement. For example:

(i) The effective thickness of the material is estimated from equation 8.

(ii) The effective thickness value is used to correct the mass attenuation coefficients based on a predetermined algorithm (usually the coefficients reduce quadratically with increasing thickness).

(iii) The values of m1 and m2 are estimated using NEUGAT (equations 1 and 2).

(iv) The composition W is determined using equation 5 and expressed as a weight percent.

(v) The results of (i) and (iii) are used to determine RHO.

(vi) The precision of the measurements of W and RHO can be calculated using a standard statistical analysis such as that described by Tominaga et al in International Journal of Applied Radiation and Isotopes, 34, 429 (1983).

The procedure for making real time measurements of mixtures of the "standard" materials 1 and 2 using NEUGAT alone has been described thus far, however, the importance of the W-RHO plane becomes apparent when different mixtures are used.

The procedure that is now to be described enables real time measurements of mixtures of any chemical combination to be made and interpreted. Every chemical combination will have a grouped response somewhere on the defined W-RHO plane but of course that is now not confined to the NEUGAT line since that was defined solely with respect to the "standard" materials 1 and 2.

The NEUGAT response is unique to each chemical so it can be thought of in terms of a signature or fingerprint. Similar chemicals give similar responses and in fact the distance between the (x,y) values for each chemical grouping is a measure of how similar certain chemicals are. Explosives and drugs have characteristic features and thus distinctive signatures that enable their detection by the invention method and device of the present invention. For example, explosives have characteristically high densities of nitrogen and hydrogen, and while drugs have lesser densities they usually have high hydrogen concentrations. Experimentation will reveal the regions on the W-RHO plane that characterise other groups of chemically similar compounds such as prohibited materials.

Some regions of the W-RHO plane may overlap and so to enable accurate determinations the W-RHO plane can be extended to three or more dimensions by introducing other constraints such as neutron activation.

Figure 7:
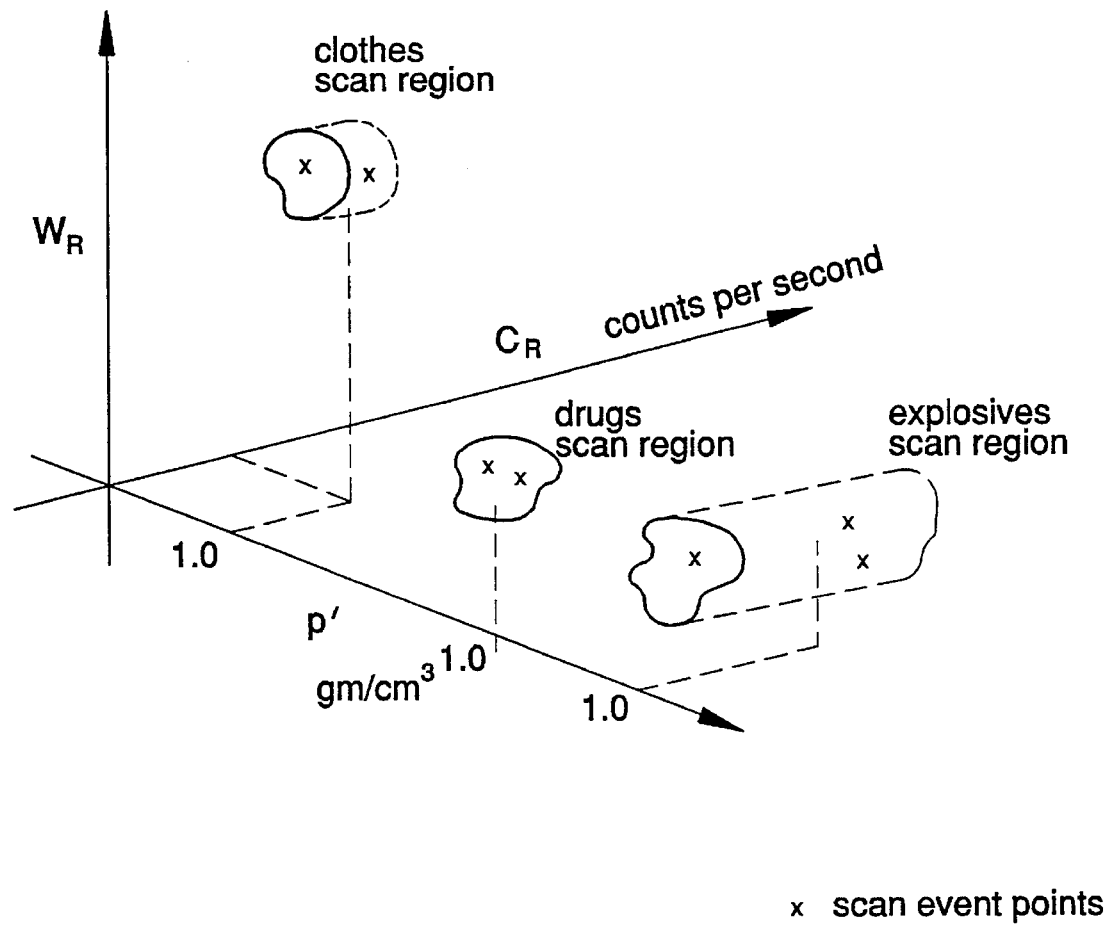
FIG. 7 represents a graphical representation similar to that shown in FIG. 6 except the nitrogen gamma count rate is additionally shown by means of a third axis.

FIG. 6b shows a possible separation of explosives, drugs and clothes using the W-RHO plane NEUGAT approach and FIG. 7 shows an extension to three dimensions by including neutron activation data. Four or more dimensions can be used if necessary if a number of complementary methods are brought to bear on the problem.

The presence of nitrogen can be monitored in addition to neutron/gamma transmission using the $^{14}N(n,\gamma)^{15}N$ reaction. This is graphically illustrated in FIG. 7. $C_R$ represents the nitrogen gamma count rate and:

$I_n$=transmitted neutrons;
$I_\gamma$=transmitted gamma rays;
$I_{no}$=incident neutrons;
$I_{\gamma o}$=incident neutrons;
$\mu_{n1}$=mass attenuation coefficient for reference material 1 (neutrons);
$\mu_{n2}$=mass attenuation coefficient for reference material 2 (neutrons);
$m_1$=areal density of reference material 1;
$m_2$=areal density of reference material 2;
$\mu_{\gamma 1}$=mass attenuation coefficient for reference material 1 (gamma rays);
$\mu_{\gamma 2}$=mass attenuation coefficient for reference material 2 (gamma rays);
RHO=density;
rho1=density of reference material 1;
rho2=density of reference material 2;
$\mu_{\gamma exp}$=mass attenuation coefficient for pure explosive (gamma rays);
$o_{exp}$=density of explosive; and The reference materials are chosen so that materials such as explosives, drugs are conveniently portrayed. The reference materials, which may be hypothetical, are specified by the choice of the mass attenuation coefficients $\mu_{1n}$, $\mu_{2n}$, $\mu_{1\gamma}$ and $\mu_{2\gamma}$.

The positions of the "scan event points" depend on the "relative amounts" of the reference materials present. In actuality, other materials may be present with different mass attenuation coefficients, but particular materials will be grouped in definite regions of the scan event graphs.

The foregoing describes the invention including a preferred method and device thereof. Alterations and modifications as will be obvious to one skilled in the art are intended to be incorporated within the scope of the invention which is defined by the following claims.

I claim:

1. A method for detecting the presence of a number of substances in a container, which comprises irradiating the container with fast neutron and gamma source radiation, measuring the extent to which each species of the source radiation is transmitted through the container, and analyzing the measurements with reference to known characteristic attenuation coefficients and density properties of the substances for each species of the source radiation to determine from the attenuation of both the transmitted neutron and gamma source radiations the presence of said substances.

2. A method according to claim 1 wherein the container is irradiated by the fast neutron and gamma radiation substantially simultaneously.

3. A method according to claim 2 wherein the neutron and gamma source radiation have different frequencies so they can be readily distinguished.

4. A method according to claim 3 wherein the source radiation is produced by a radioactive isotopic source.

5. A method according to claim 4 wherein the radioactive source is californium-252 or americium-beryllium.

6. A method according to claim 3 wherein a number of containers are passed between irradiating means and transmission measurement means.

7. A method according to claim 3 wherein thermal neutron activation and/or x-ray measurements are made in addition to the neutron and gamma radiation transmission measurements to aid the analysis.

8. A method according to claim 3 wherein the transmission measurements are analysed by data processing means and the results are displayed.

9. A method according to claim 8 wherein an alarm is triggered when at least one of the substances is detected.

10. A method according to claim 3 wherein the substances are drugs and/or explosives.

11. A method according to claim 10 wherein the container is a suitcase, bag or package.

12. Apparatus for detecting the presence of a number of substances in a container, which comprises means which irradiates the container with fast neutron and gamma source radiation, means which measures the extent to which each species of said radiation is transmitted through the container, and means which analyses the measurements with reference to known characteristic attenuation coefficients and density properties of the substances for each species of the source radiation and determines from the attenuation of both the transmitted neutron and gamma source radiations the presence of said substances.

13. Apparatus according to claim 12 wherein the irradiating means emits the neutron and gamma source radiation substantially simultaneously.

14. Apparatus according to claim 13 wherein the irradiating means emits neutron and gamma radiation that have different flight times or detector responses so they can be readily distinguished.

15. Apparatus according to claim 14 wherein the irradiating means comprises a radioactive isotopic source.

16. Apparatus according to claim 15 wherein the isotopic source is californium-252 or americium-beryllium.

17. Apparatus according to claim 15 wherein the irradiating means and the transmission measuring means are housed in a detecting unit.

18. Apparatus according to claim 14 which includes means which conveys a number of containers between the irradiating means and the transmission measuring means.

19. Apparatus according to claim 18 wherein said analyzing means is a data processor.

20. Apparatus according to claim 19 wherein said data processor has a monitor to display the results of the analysis.

21. Apparatus according to claim 14 further including means which measures thermal neutron activation of the substances in the container and/or x-ray measurement means to aid the analysis.

22. Apparatus according to claim 14 further including an alarm system that is triggered when at least one of the substances is detected.

23. Apparatus according to claim 14 which can detect the presence of drugs and/or explosives in suitcases, bags and packages.

* * * * *